(12) United States Patent
Oyler et al.

(10) Patent No.: US 7,696,131 B2
(45) Date of Patent: Apr. 13, 2010

(54) DIESEL OIL-BASED INVERT EMULSION DRILLING FLUIDS AND METHODS OF DRILLING BOREHOLES

(75) Inventors: Kenneth W. Oyler, Baytown, TX (US); Kimberly J. Burrows, Kingwood, TX (US); Gary C. West, Spring, TX (US); Don Siems, Houston, TX (US); Jeff Kirsner, Hermosa Beach, CA (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/825,236

(22) Filed: Jul. 5, 2007

(65) Prior Publication Data

US 2008/0015118 A1    Jan. 17, 2008

Related U.S. Application Data

(63) Continuation-in-part of application No. 10/292,124, filed on Nov. 12, 2002, now Pat. No. 7,456,135, which is a continuation-in-part of application No. 10/175,272, filed on Jun. 19, 2002, now Pat. No. 6,887,832.

(51) Int. Cl.
*B01F 3/08* (2006.01)
*C09K 8/02* (2006.01)

(52) U.S. Cl. .................. 507/103; 175/65; 507/138; 507/136; 507/140; 516/21

(58) Field of Classification Search .......... 507/103, 507/138, 136, 140; 175/65; 516/21
See application file for complete search history.

(56) References Cited

U.S. PATENT DOCUMENTS

| | | | | | |
|---|---|---|---|---|---|
| 2,994,660 | A | * | 8/1961 | Reddie et al. | 507/131 |
| 3,628,615 | A | * | 12/1971 | Chenevert | 175/25 |
| 3,709,819 | A | * | 1/1973 | Browning et al. | 507/119 |
| 4,735,732 | A | * | 4/1988 | Clapper et al. | 507/107 |
| 6,006,831 | A | * | 12/1999 | Schlemmer et al. | 166/250.01 |

OTHER PUBLICATIONS

U.S. Court of Appeals for the Federal Circuit opinion of Jan. 25, 2008 in Halliburton Energy Services, Inc. v. M-I, LLC, 2007-1149, re US Patent No. 6,887,832 (21 pages).
Order of the Federal Circuit denying rehearing and rehearing en banc in 2007-1149 concerning U.S. Patent No. 6,887,832 (2 pages).
Halliburton's Notice of Dismissal (of lawsuit) with Prejudice in U.S. Dist. Ct (Eastern Dist of Tx) Civ. Action No. 6:07-cv-469 concerning U.S. Patent No. 7,278,485 (3 pages).
M-I, LLC & Halliburton Agreed Motion to Voluntarily Dismiss U.S. Dist Ct (Eastern Dist of Tx) Civ. Action No. 6:07-CV-311 (2 pages).
Order of the US Dist. Ct for the Eastern District of TX, Tyler, dismissing with prejudice Civ. Action No. 6:07-CV-311 (1 page).

* cited by examiner

*Primary Examiner*—Timothy J. Kugel
(74) *Attorney, Agent, or Firm*—Craig W. Roddy; Karen B. Tripp

(57) ABSTRACT

Diesel oil-based invert emulsion drilling fluids having fragile gel properties and improved performance. Methods are also disclosed for drilling, running casing, cementing, and/or producing hydrocarbons in a subterranean formation.

24 Claims, 6 Drawing Sheets

DIESEL OIL-BASED INVERT EMULSION DRILLING FLUIDS AND METHODS OF DRILLING BOREHOLES

RELATED APPLICATIONS

This application is a continuation-in-part of U.S. patent application Ser. No. 10/292,124, filed Nov. 12, 2002, issued Nov. 25, 2008 as U.S. Pat. No. 7,456,135 B2, which is a continuation-in-part of U.S. patent application Ser. No. 10/175,272, filed Jun. 19, 2002, issued May 3, 2005 as U.S. Pat. No. 6,887,832 B2. U.S. Pat. No. 7,456,135 B2 and U.S. Pat. No. 6,887,832 B2 are incorporated herein by reference in their entirety.

BACKGROUND OF THE INVENTION

1. Field of the Invention

The present invention relates to compositions and methods for drilling, cementing and casing boreholes in subterranean formations, particularly hydrocarbon bearing formations. More particularly, the present invention relates to diesel oil based drilling fluids and most particularly to diesel oil-based invert emulsion drilling fluids that provide good stability and performance properties.

2. Description of Relevant Art

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation.

Oil or synthetic fluid-based muds are normally used to drill swelling or sloughing shales, salt, gypsum, anhydrite or other evaporate formations, hydrogen sulfide-containing formations, and hot (greater than about 300 degrees Fahrenheit ("° F.") holes, but may be used in other holes penetrating a subterranean formation as well. Unless indicated otherwise, the terms "oil mud" or "oil-based mud or drilling fluid" shall be understood to include synthetic oils or other synthetic fluids as well as natural or traditional oils, and such oils shall be understood to comprise invert emulsions. Generally, as used herein, "higher temperatures" means temperatures over about 120° F. and "lower temperatures" means temperatures at about 40° F. to about 60° F. Rheology of a drilling fluid is typically measured at about 120° F. or about 150° F.

Oil-based muds used in drilling typically comprise: a base oil (or synthetic fluid) comprising the external phase of an invert emulsion; a saline, aqueous solution (typically a solution comprising about 30% calcium chloride) comprising the internal phase of the invert emulsion; emulsifiers at the interface of the internal and external phases; and other agents or additives for suspension, weight or density, oil-wetting, fluid loss or filtration control, and rheology control. Such additives commonly include organophilic clays and organophilic lignites. See H. C. H. Darley and George R. Gray, Composition and Properties of Drilling and Completion Fluids 66-67, 561-562 (5$^{th}$ ed. 1988). An oil-based or invert emulsion-based drilling fluid may commonly comprise between about 50:50 to about 95:5 by volume oil phase to water phase. An all oil mud simply comprises 100% liquid phase oil by volume; that is, there is no aqueous internal phase. Invert emulsion-based muds or drilling fluids (also called invert drilling muds or invert muds or fluids) comprise a key segment of the drilling fluids industry.

Diesel oil-based drilling fluids, and particularly diesel oil-based invert emulsion drilling fluids, have been a staple in onshore and zero-discharge drilling operations for decades, because of their stability, lubricity, temperature tolerance, and ability to inhibit reactive clays. However, diesel oil-based fluids have been known to respond relatively slowly to treatments such as additives for thinning, rheology control, and/or fluid loss, resulting in overtreatment and the need for dilution with more diesel, with consequences of the fluid becoming laden with colloidal solids that can impair drilling performance. Increasingly, drilling fluids have been subjected to greater environmental restrictions and performance and cost demands. There is consequently an increasing need and industry-wide interest in new drilling fluids that provide improved performance while still affording environmental and economical acceptance.

SUMMARY OF THE INVENTION

The present invention provides improved methods of drilling wellbores in subterranean formations employing diesel oil-based muds, or more particularly, invert emulsion-based muds or drilling fluids comprising diesel oil. As used herein, the term "drilling" or "drilling wellbores" shall be understood in the broader sense of drilling operations, which include running casing and cementing as well as drilling, unless specifically indicated otherwise. The present invention also provides diesel oil-based invert emulsion drilling fluids for use in the methods of the invention to effect the advantages of the invention.

The methods of the invention comprise using a diesel oil-based drilling fluid that is not dependent on organophilic clays (also called "organo-clays") or lignites to obtain suspension of drill cuttings or other solids. Rather, the drilling fluid comprises a synergistic combination of an invert emulsion diesel base, one or more rheology and fluid loss control additives, one or more emulsifiers, and/or optionally other additives, that form a "fragile gel" or show "fragile gel" behavior when used in drilling. The fragile gel structure of the drilling fluid, with relatively low colloidal content for a diesel based fluid, is believed to provide or enable suspension of drill cuttings and other solids and to afford the fluid excellent suspension and hole cleaning characteristics.

The fragile gel drilling fluids of the invention, for use in the methods of the invention, are characterized by their performance. When drilling is stopped while using a fluid of the invention, and consequently when the stresses or forces associated with drilling are substantially reduced or removed, the drilling fluid acts as a gel, suspending/continuing to suspend drill cuttings and other solids (such as for example weighting materials) for delivery to the well surface. Nevertheless, when drilling is resumed, the fluid is flowable, acting like a liquid, with reduced or no substantial pressure spike (or no appreciable or noticeable pressure spike), as observed by pressure-while-drilling (PWD) equipment or instruments. During drilling, the fluids of the invention generally maintain consistently low values for the difference in their surface density and their equivalent density downhole (ECDs) and show significantly reduced loss when compared to other drilling fluids used in that formation or under comparable conditions. "Sag" problems do not tend to occur with the fluids of the invention when drilling deviated wells. The phenomenon of "sag," or "barite sag" is discussed below.

Diesel oil-based drilling fluids of the invention are particularly advantageous for use in onshore wells, and provide rheology and fluid loss control as well as desired suspension properties and enhanced temperature tolerance (i.e., retains desired characteristics) to at least about 450° F. or even as high as about 500° F. or higher. The fluids of the invention yield flatter rheological profiles than other diesel based systems (e.g., see Tables 4, 5, and 6). Also, the fluids of the invention respond quickly to the addition of thinners or other treatments, with thinning or other treatment response of the fluids occurring soon after the thinners or other treatments are added, at least within one-half trip in the wellbore, and without need for multiple circulations of the fluids with the thinners or other treatment additive or additives in the wellbore to show the effect of the addition of the thinners or other treatments. Examples of such treatment additives other than thinners are emulsifiers and lost circulation control additives, although the fluids of this invention already show minimal downhole fluid losses when compared to other diesel based fluids.

The fluids of the invention also provide an enhanced rate of penetration during drilling, an important indicator of drilling performance, when compared to other diesel fluid systems. Such faster drilling time results in substantial savings in rig costs.

Although the invention is characterized primarily as identifying characteristics or features of a diesel oil-based invert emulsion drilling fluid that yields superior performance for use in drilling, certain example compositions also provide significant benefits in terms of environmental acceptance or regulatory compliance.

Examples of preferred diesel oil-based invert emulsion drilling fluids of the invention have added to or mixed with the diesel base, other fluids or materials needed to comprise a complete drilling fluid that are environmentally acceptable and regulatory compliant. Such materials may include, for example: additives for enhancing viscosity, for example, an additive having the tradename RHEMOD L™ suspension agent/viscosifier (modified fatty acid comprising dimeric and trimeric fatty acids) and an additive having the tradename POLYBOOST™ (non-organophilic clay/crystalline silica material) used to impart viscosity and suspension properties; additives for filtration control, for example, additives having the tradename ADAPTA® or ADAPTA® HP filtration control agent (methylstyrene/acrylate copolymer particularly suited for providing HPHT filtration control in non-aqueous fluid systems); additives for emulsification, for example, additives having the tradename LE SUPERMUL™ (polyaminated fatty acid) and the tradename FORTI-MUL™ (ethylene glycol monobutyl ether/diethylene glycol monobutyl ether/diesel blend); additives for high temperature high pressure control (HTHP) and emulsion stability, for example, additives having the tradename FACTANT™ (highly concentrated tall oil derivative); and additives to provide thinning, for example, an additive having the tradename DRIL-TREAT® (lecithin liquid dispersion). All of the aforementioned trademarked products are available from Halliburton Energy Services, Inc. in Houston, Tex., U.S.A.

However, as previously noted, preferably no organophilic clays or lignites are added to the drilling fluid for use in the invention. Any characterization of the drilling fluid herein as "clayless" shall be understood to mean lacking organophilic clays. Omission of organophilic clays and lignites is a radical departure from traditional teachings respecting preparation of drilling fluids, and particularly diesel based drilling fluids. However, this omission of organophilic clays and lignites in preferred embodiments of the present invention allows the drilling fluid to have low, reduced, or even substantially little or no colloidal solids and greater tolerance to drill solids (i.e., the properties of the fluid are not believed to be readily altered by the drill solids or cuttings). Further, this omission of organophilic clays and lignites in preferred embodiments of the present invention is believed (without limiting the invention by theory) to contribute to the fluid's superior properties in use as a drilling fluid.

DETAILED DESCRIPTION OF PREFERRED EMBODIMENTS

The present invention provides a diesel oil-based invert emulsion drilling fluid (also referred to herein as a "diesel based invert drilling fluid" and as a "diesel based fluid of the present invention") that meets onshore environmental constraints and provides improved performance in the field. The fluid does not rely on organophilic clays or lignites to obtain suspension of barite or drill cuttings, in contrast to other diesel based drilling fluids used commercially today. Some of the other characteristics that further distinguish the drilling fluid of the present invention from other diesel and diesel invert fluids are: (1) no or substantially no pressure spikes (as detected for example with pressure-while-drilling or PWD equipment or instruments) when resuming pumping after a period of rest during drilling; (2) rapid incorporation of additives while pumping; (3) no or substantially no sag of barite or other solids, including drill cuttings; (4) reduction in fluid losses during drilling; (5) faster rates of penetration when drilling; and (6) low ECDs. These characteristics will be further explained and discussed below.

The distinctive, advantageous, characteristics of the diesel based fluid of the present invention are believed to be due, at least in part, to a synergistic combination of components which are believed, without limiting the invention by theory, to have the effect of forming a "fragile gel," comprising tightly emulsified water droplets and low or no colloidal solids. A "gel" may be defined a number of ways. One definition indicates that a "gel" is a generally colloidal suspension or a mixture of microscopic water particles (and any hydrophilic additives) approximately uniformly dispersed through the oil (and any hydrophobic additives), such that the fluid or gel has a generally homogeneous gelatinous consistency. Another definition states that a "gel" is a colloid in a more solid form than a "sol" and defines a "sol" as a fluid colloidal system, especially one in which the continuous phase is a liquid. Still another definition provides that a "gel" is a colloid in which the disperse phase has combined with the continuous phase to produce a viscous jelly-like product. Generally, a gel has a structure that is continually building. If the yield stress of a fluid increases over time, the fluid has gelled. "Yield stress" is the stress required to be exerted to initiate deformation.

Figure 1A:
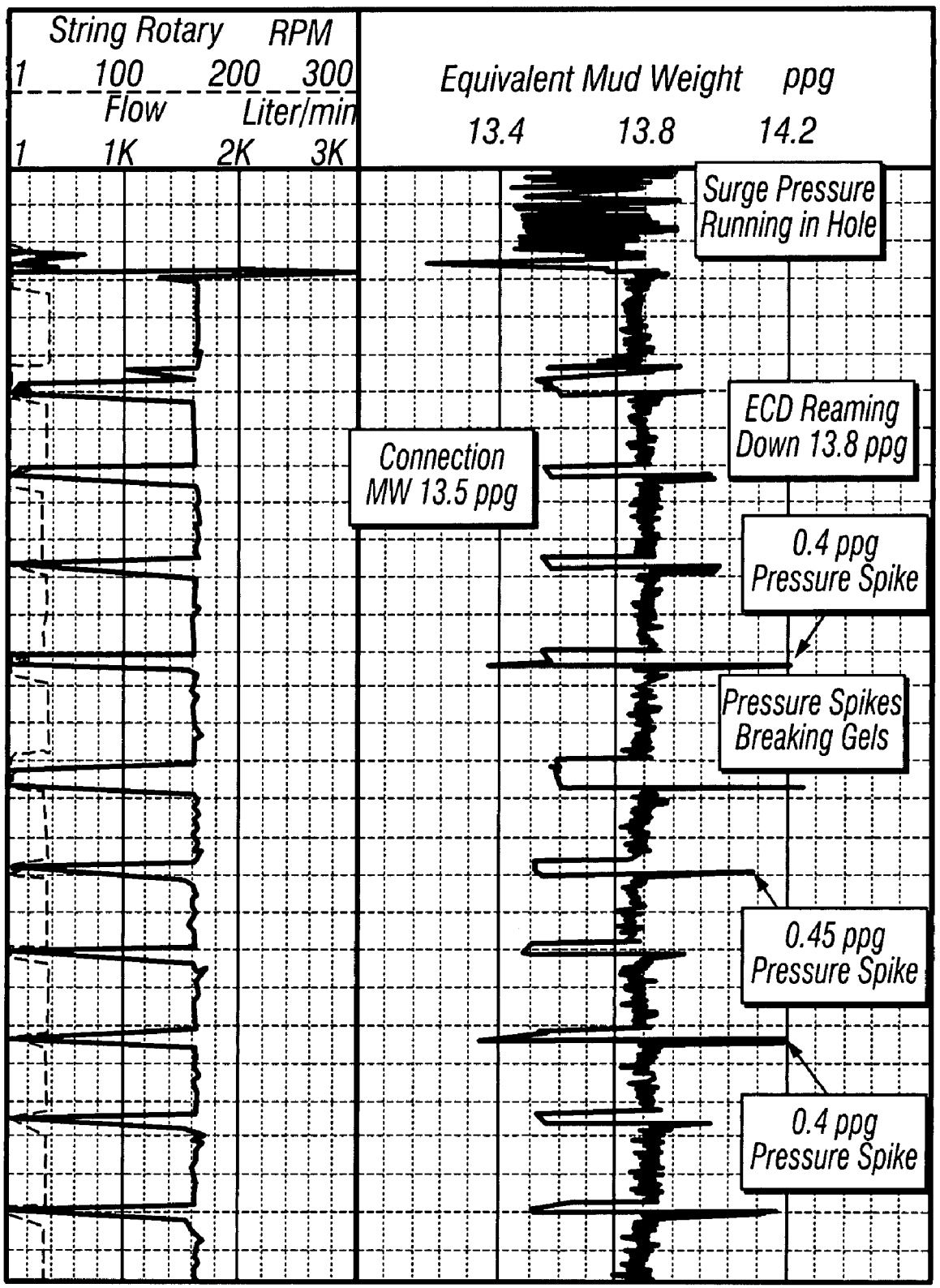
FIG. 1(a) provides a graph showing field data indicating typical pressure spikes after connections and trips with a commercial diesel oil-based invert emulsion drilling fluid formulated with an organophilic clay viscosifier, for comparison with FIG. 1(b) which provides a graph showing field data with a diesel oil-based invert emulsion drilling fluid of the present invention having substantially no pressure spikes after connections and trips.
Figure 1B:
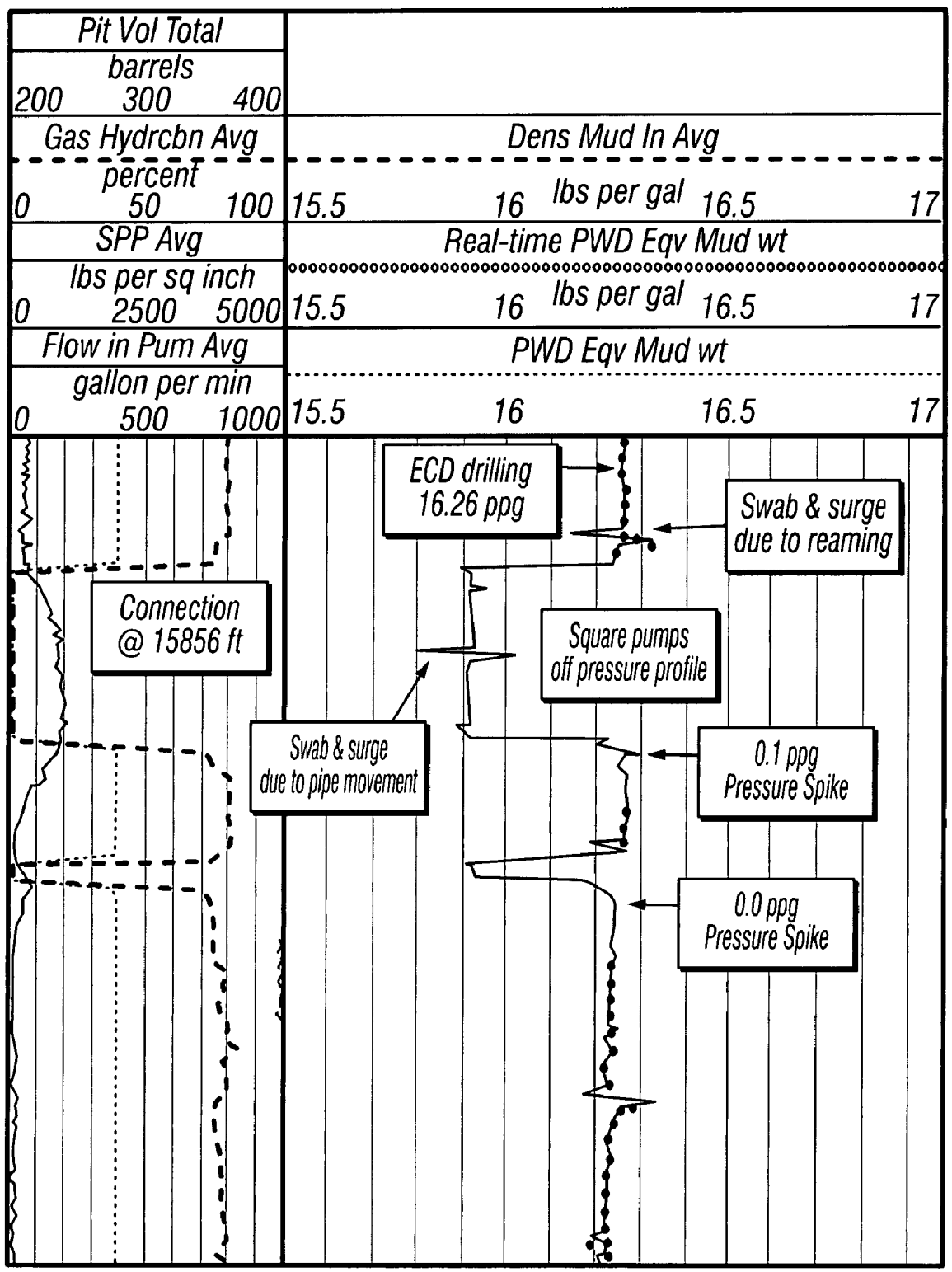

A "fragile gel" as used herein is a "gel" that is easily disrupted or thinned, and that liquifies or becomes less gel-like and more liquid-like under stress, such as caused by moving the fluid, but which quickly returns to a gel or gel-like state when the movement or other stress is alleviated or removed, such as when circulation of the fluid is stopped, as for example when drilling is stopped. The "fragileness" of the "fragile gels" of the present invention contributes to the unique and surprising behavior and advantages of the present invention. The gels are so "fragile" that it is believed that they may be disrupted by a mere pressure wave or a compression wave during drilling. They break instantaneously when disturbed, reversing from a gel back into a liquid form with minimum pressure, force and time and with less pressure, force and time than known to be required to convert prior art fluids from a gel-like state into a flowable state. This "fragile" characteristic results in reduced, barely detectable, or substantially no pressure spikes, or lack of noticeable or significant pressure spikes, (as detected for example with pressure-while-drilling or PWD equipment or instruments) when pumping is resumed after a period of rest during drilling. Such minimal pressure spikes when "breaking circulation" afford operators significantly lower downhole fluid losses when drilling, running casing or cementing with fluids of the present invention. For comparison, FIG. 1(a) shows typical pressure spikes with a commercial diesel based drilling fluid formulated with an organophilic clay viscosifier and FIG. 1(b) shows substantial lack of pressure spikes as typical with a diesel based drilling fluid of the present invention.

Figure 2:
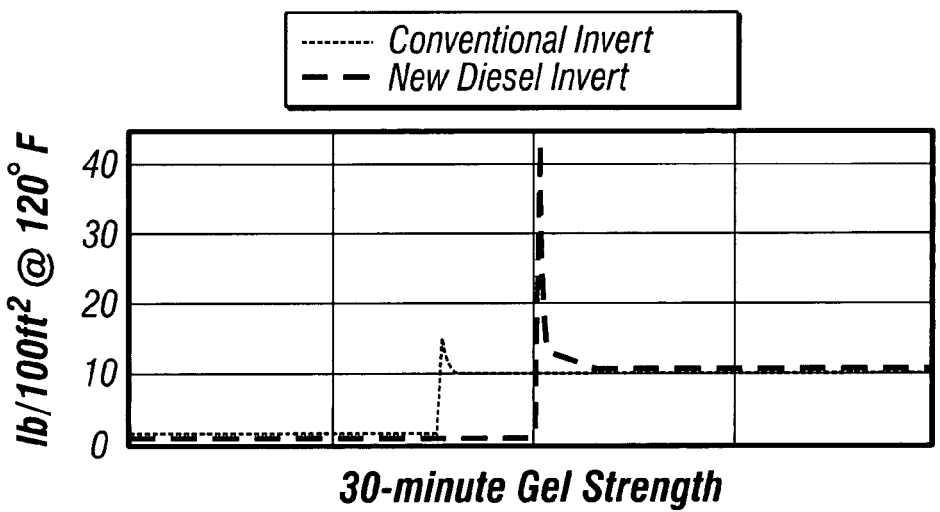
FIG. 2 is a graph comparing fragile gel strength of a diesel oil-based invert emulsion fluid of the present invention with the gel strength of a commercial diesel oil-based invert emulsion drilling fluid formulated with an organophilic clay viscosifier.

The gel strength and strong suspension ability of the fluids of the present invention are demonstrated in FIG. 2. That figure compares the 30-minute gel strength (as measured by a Brookfield test, discussed further below) of a commercial diesel based drilling fluid formulated with an organophilic clay viscosifier to that of a diesel based drilling fluid of the present invention. The figure shows that the example fluid of the present invention has a gel strength or a peak value of about 40 lb/100 ft$^2$ and then when shear is resumed returns to about 10 lb/100 ft$^2$ at 120° F. whereas the gel strength or peak value of the diesel fluid with the organophilic clay viscosifier peaks at 15 lb/100 ft$^2$ and then when shear is resumed returns to about 10 lb/100 ft$^2$ at 120° F.

In contrast to the fluids of the present invention, diesel based drilling fluids using clays and/or lignites to achieve suspension of solids (such as barite and drill cuttings) are believed to have linked or interlinked clay and/or lignite particles providing structure. That is, organophilic clays or organo-clays, which are typically formed from montmorillonite treated with a di-alkyl cationic surfactant, swell in non-polar organic solvents, forming open aggregates. This structure, combined with the volume occupied by water droplets, is believed to be the main suspending mechanism for barite and other inorganic materials in conventional invert drilling fluids. Mixing additives into the oil/organo-clay suspended system is slower than mixing additives into drilling fluids of the invention. In such diesel mud systems with organo-clay, this slow activation of additives can lead to overtreatment, excessively thick mud, and the need for dilution with diesel, while the fluid in turn becomes laden with colloidal solids that can impair drilling performance. Further, such diesel muds can require excessive pressure to "break" when "breaking circulation" (resuming drilling after connections and static periods, such as tripping, for example, or other periods of rest during drilling), resulting in significant spiking on the well log and pressure surging against the wellbore.

The unique "fragile" gel nature or structure of the fluid of the invention contributes to relatively low "ECDs" obtained with the fluid. The difference in a drilling fluid's measured surface density at the well head and the drilling fluid's equivalent circulating density downhole (as typically measured during drilling by downhole pressure-while-drilling (PWD) equipment) is often called "ECD" in the industry. Low "ECDs", that is, a minimal difference in surface and downhole equivalent circulating densities, is critical in drilling wells where the differences in subterranean formation pore pressures and fracture gradients are small.

Further, the unique "fragile" gel structure of the fluid of the invention contributes to an increased drilling rate or rate of penetration when using the fluid of the invention. In a conventional or typical diesel based drilling fluid, a high colloidal solids content can impair the rate of penetration and increase the demand for diesel and additives. However, with the present invention, there is no need to add organophilic clays or other organophilic colloidal solids that are commonly used in diesel-based muds as viscosifiers and gelling agents. Field data demonstrating the advantageous rate of penetration of example diesel based fluids of the present invention are provided and discussed below.

The diesel based drilling fluids of the invention respond quickly to the addition of treatment additives such as fluid loss control agents, emulsifiers, thinners, viscosifiers, and other rheology control agents, with treatment response of the fluids occurring soon after the additives are added, at least within one-half trip in the wellbore, and without need for multiple circulations of the fluids with the additives in the wellbore to show the effect of the addition of the additives. This characteristic provides the drilling operator with the ability to control the fluid rheology "on-the-fly" and "on-command" from the wellbore surface, facilitating control of fluid rheological properties real time.

Another distinctive and advantageous characteristic or feature of the diesel based drilling fluids of the invention is that sag does not occur or does not significantly occur when the fluids are used in drilling deviated wells. Suspensions of solids in non-vertical columns are known to settle faster than suspensions in vertical ones, due to the "Boycott effect." This effect is driven by gravity and impeded by fluid rheology, particularly non-Newtonian and time dependent rheology. Manifestation of the Boycott effect in a drilling fluid is known as "sag." Sag may also be described as a "significant" variation in mud density (>0.5 to 1 pound per gallon) along the mud column, which is the result of settling of the weighting agent or weight material and other solids in the drilling fluid. Sag can result in formation of a bed of the weighting agent on the low side of the wellbore, and stuck pipe, among other things. In some cases, sag can be very problematic to the drilling operation and in extreme cases may cause hole abandonment.

Field-based fluids (as opposed to laboratory fluids or muds) may yield varying results in the tests discussed herein because of the presence of other fluids, subterranean formation conditions, etc. Some field test data will be presented and discussed further below.

While some organo-clay may enter the fluids in the field, for example, due to mixing of recycled fluids with the fluids of the invention, the fluids of the invention are tolerant of such clay to some extent. However, the fluids of the invention behave more like conventional drilling fluids with organophilic clay viscosifiers as the amounts of organophilic clay increase. The exact tolerance of the fluids of the invention to the organophilic clay, that is, the exact amount of organophilic clay that can be added or be present in the fluids and still have the fluids of the invention achieve their distinctive, advantageous characteristics of the invention, varies with the density of the fluids and the operating conditions and wellbore characteristics. Generally, while formulation of the fluids with no organo-clays is preferred, it is believed that the fluids of the invention can usually achieve their advantageous characteristics in the presence of less than about 3 pounds per barrel of organo-clays. As understood by persons of ordinary skill in the art, organo-clay may be present in fluids of the invention in quantities that are not sufficient to destroy or nullify the distinctive, advantageous characteristics of the invention as described herein.

Water influx and other contaminants can also enter the wellbore in the field. The fluids of the invention typically exhibit no adverse response to even substantial influx of water. Fluids of the present invention have been found to easily withstand unplanned water flows that have reduced the OWR (oil to water ratio) to as low as 52/48, without evidence of water-wet solids or water in the HPHT filtrate. For example, an operator took a 196-bbl salt water kick while drilling with a 16.0 ppg INTEGRADE™ drilling fluid system in an onshore Louisiana field. The INTEGRADE™ drilling fluid system is an example diesel based invert drilling fluid of the present invention, commercially available from Halliburton Energy Services, Inc. in Houston, Tex. The oil/water ratio dropped from 77/23 to 52/48. The electrical stability went from 640 to 272. Under these conditions, a conventional oil-based mud might be expected to "flip"—costing rig time for displacement and remediation. The INTEGRADE™ system exhibited no adverse response to the influx and remained extremely stable throughout the event and subsequent kill procedure with minimal conditioning. The fluid properties before and after the water influx are summarized in Table 1 below.

TABLE 1

INTEGRADE ™ Fluid Properties - 196 bbl Salt Water Influx

| Properties | Active System Prior To Flow | Bottoms Up From Flow |
|---|---|---|
| PV W 150° F., cP | 37 | 48 |
| YP @ 150° F., lbs/100 ft$^2$ | 17 | 22 |
| Gels, 10 s/10 m/30 m, lbs/100 ft$^2$ | 12/18/19 | 14/23/25 |
| HPHT @ 300° F., ml/30 min | 2.0 | 2.0* |
| Electric Stability, volts | 640 | 272 |
| Mud Weight, ppg | 16.4 ppg | 15.7 ppg |
| Oil Water Ratio | 76.9:23.1 | 52:48 |
| Water Phase Salinity, ppm | 251, 604 | 143, 444 |
| Funnel Viscosity, sec/qt. | 60 @ 140° F. | 68 @ 140° F. |

Fluids of the present invention typically have higher water content, and less diesel oil, by design than other diesel oil-based muds. See FIG. 3, for example, which will be discussed further below. The water phase has high-salinity and the fluids exhibit excellent inhibition, osmotic membrane effect and protection against water wetting. As noted above and shown in FIG. 2, the recorded gel strengths for the fluids of the invention may appear somewhat elevated when compared to other diesel muds, yet the "gels" of the drilling fluids of the present invention are easily "broken," as shown in FIG. 1(b) when circulation commences so that ECD and surge pressures are minimized. This feature or characteristic helps eliminate the need to "stage in" the hole when "breaking circulation" (i.e., resuming circulation after periods of static or rest)—and thus allows operators to save rig time and thereby reduce drilling costs.

Fluids of the present invention are suitable for a wide range of drilling applications and have been proven and tested to achieve superior high return permeabilities when used to drill the reservoir (or hydrocarbon producing) section of the well. Fluids of the present invention can be used to drill any well type conventionally drilled with oil-based muds, including without limitation HPHT, casing drilling, zero discharge (onshore, offshore), slim-hole drilling, high-angle or horizontal intervals, and coiled tubing applications.

Any drilling fluid that can be formulated to provide "fragile gel" behavior as described herein is believed to have the benefits of the present invention. Further, drilling fluids of the present invention provide suspension of weighting agents and/or drill cuttings when stresses or forces associated with drilling are reduced or removed and produce substantially no pressure spike or pressure surge against the subterranean formation upon resumed drilling.

While the invert emulsion drilling fluids of the present invention have a diesel invert emulsion base, this base is not limited to a single formulation. Test data discussed herein is for example formulations of diesel oil-invert emulsion based drilling fluids of the invention. However, a drilling fluid comprising a blend of diesel with one or more other natural or synthetic oils could also be used provided the fluid forms fragile gels or yields fragile gel behavior and provides low ECDs. For example, a polyalphaolefin (PAO), which may be branched or unbranched but is preferably linear and preferably ecologically acceptable (non-polluting oil) blended with diesel oil demonstrates some advantages of the invention. For another example, isomerized or internal olefins could also be blended with the diesel.

Isomerized or internal olefins for blending with the diesel may be any such olefins, straight chain, branched, or cyclic, preferably having about 10 to about 30 carbon atoms. Isomerized, or internal, olefins having about 40 to about 70 weight percent $C_{16}$ and about 20 to about 50 weight percent $C_{18}$ are especially preferred. An example of an isomerized olefin for use in the blend in the invention that is commercially available is SF BASE™ fluid, available from Halliburton Energy Services, Inc. in Houston, Tex. Alternatively, other hydrocarbons such as paraffins, mineral oils, glyceride triesters, or combinations thereof may be substituted for or added to the olefins in the diesel blend. Such other hydrocarbons may comprise from about 1 weight percent to about 99 weight percent of such blend. Further possible invert emulsion bases for drilling fluids that may obtain the characteristics and advantages of the present invention are discussed in U.S. patent application Ser. No. 10/292,124 and U.S. Pat. No. 6,887,832 B2, both of which are incorporated herein by reference in their entirety.

Field data discussed below has demonstrated that the fluids of the invention are superior to other diesel based drilling fluids. Moreover, the principles of the methods of the invention may be used with any invert emulsion drilling fluids that form fragile gels or yield fragile gel behavior, and provide low ECDs.

The exact proportions of the components comprising a diesel base (or diesel blend base) for an invert emulsion for use in the present invention will vary depending on drilling requirements (and characteristics needed for the base to meet those requirements), supply and availability of the components, cost of the components, and characteristics of the base necessary to meet environmental regulations or environmental acceptance. The manufacture of the various components of a diesel, or a diesel blend, invert emulsion base is understood by one skilled in the art. Generally, the fluids of the invention will require less diesel than other diesel based drilling fluids and the fluids of the invention will show substantially less fluid loss during drilling.

Further, the diesel invert emulsion based drilling fluids of the invention or for use in the present invention have added to them or mixed with their diesel invert emulsion base, other fluids or materials needed to comprise complete drilling fluids. Such materials may include, for example: additives for enhancing viscosity, for example, an additive having the tradename RHEMOD L™ suspension agent/viscosifier (modified fatty acid comprising dimeric and trimeric fatty acids); additives for filtration control, for example, an additive having the tradename ADAPTA® (methylstyrene/acrylate copolymer particularly suited for providing HPHT filtration control in non-aqueous fluid systems); additives for high temperature high pressure control (HTHP) and emulsion stability, for example, an additive having the tradename FACTANT™ (highly concentrated tall oil derivative); additives for emulsification, for example, additive having the tradenames LE SUPERMUL™ (polyaminated fatty acid) and FORTI-MUL™ (ethylene glycol monobutyl ether/diethylene glycol monobutyl ether/diesel blend); and additives to provide thinning, for example, an additive having the tradename DRILTREAT™ (lecithin liquid dispersion). All of the aforementioned trademarked products are available from Halliburton Energy Services, Inc. in Houston, Tex., U.S.A. Additionally, the fluids comprise an aqueous solution containing a water activity lowering compound, composition or material, comprising the internal phase of the invert emulsion. Such solution is preferably a saline solution comprising calcium chloride (typically about 25% to about 30%, depending on the subterranean formation water salinity or activity), although other salts or water activity lowering materials known in the art may alternatively or additionally be used.

Preferably, the fluids of the present invention comprise a minimal number of components. A preferred example diesel invert emulsion based drilling fluid of the present invention comprises only about three products for rheology, filtration and emulsification, as opposed to the five or more additives typically used in most oil-based muds. Such example preferred formulation comprises FORTI-MUL™ emulsifier, RHEMOD™ L viscosifier and ADAPTA™ HPHT filtration control agent and/or FACTANT™ filtration control agent, all available form Halliburton Energy Services, Inc. in Houston, Tex. The fewer materials needed on location, the greater the savings in transportation expenses. A system that uses fewer products helps decrease the usage of trucks onshore and the number of crane lifts required for zero-discharge offshore operations. In the case of multi-well applications, the cost savings can be significant.

The formulations of the fluids of the invention, and also the formulations of the other diesel based drilling fluids, used in drilling the boreholes cited in the field data below, vary with the particular requirements of the subterranean formation. Tables 2(a) and (b) below, however, provide example formulations and properties for these two different types of fluids discussed in the field data below. All trademarked products in Tables 2(a) and (b) are available from Halliburton Energy Services, Inc. in Houston, Tex., including: EZ MUL® emulsifier (polyaminated fatty acid); INVERMUL® emulsifier (blend of tall oil and polyaminated fatty acid); LE SUPERMUL™ emulsifier (polyaminated fatty acid); DURATONE® HT filtration control agent (organophilic leonardite); ADAPTA® filtration control agent (methylstyrene/acrylate copolymer particularly suited for providing HPHT filtration control in non-aqueous fluid systems); RHEMOD L™ suspension agent/viscosifier (modified fatty acid comprising dimeric and trimeric fatty acids); POLYBOOST™ non-organophilic clay/crystalline silica material used to impart viscosity and suspension properties to oil-based drilling fluids; and GELTONE® II viscosifier (organophilic clay). In determining the properties in Table 2, samples of the fluids were sheared in a Silverson commercial blender at 7,000 rpm for 10 minutes, rolled at 150° F. for 16 hours, and stirred for 10 minutes. Measurements were taken with the fluids at 120° F., except where indicated otherwise. Table 3(a) provides FANN 75 viscometer data for Sample C of the INVERMUL® diesel fluid from Table 2(a) and Table 3(b) provides FANN 75 rheometer data from Sample F of the example fluid of the present invention from Table 2(b).

TABLE 2(a)

INVERMUL ™ Mud Formulations and Properties
(Example Formulation & Properties of a Commercial Diesel Drilling
Fluid Comprising Clay) 12 lb/gal, 75/25 OWR, 250K ppm $CaCl_2$ WPS

| | Sample Formulation | | |
|---|---|---|---|
| | A | B | C |
| Diesel, bbl | 0.568 | 0.568 | 0.568 |
| INVERMUL[1] ®, lb | 5 | 5 | 5 |
| Lime, lb | 5 | 5 | 5 |
| DURATONE ® HT[2], lb | 8 | 8 | 8 |
| GELTONE ® V[3], lb | 4 | 4 | 3 |
| Water, bbl | 0.204 | 0.204 | 0.204 |
| EZ MUL ®[4], lb | 8 | 8 | 8 |
| SUSPENTONE ™[5], lb | 2 | — | — |
| Barite, lb | 208 | 208 | 208 |
| Calcium Chloride, lb | 24.8 | 24.8 | 24.8 |
| Properties | | | |
| Rolled @ 150° F., hr | 16 | 16 | 16 |
| Stirred, min | 10 | 10 | 10 |
| Temperature, ° F. | 120 | 120 | 120 |
| Plastic viscosity, cP | 22 | 21 | 19 |

TABLE 2(a)-continued

INVERMUL ™ Mud Formulations and Properties
(Example Formulation & Properties of a Commercial Diesel Drilling
Fluid Comprising Clay) 12 lb/gal, 75/25 OWR, 250K ppm CaCl$_2$ WPS

| | Sample Formulation | | |
|---|---|---|---|
| | A | B | C |
| Yield point, lb/100 ft$^2$ | 26 | 21 | 18 |
| Tao 0, lb/100 ft$^2$ | 10.3 | 9.2 | 6.0 |
| 10 Sec gel, lb/100 ft$^2$ | 13 | 11 | 7 |
| 10 Min gel, lb/100 ft$^2$ | 14 | 11 | 9 |
| Electrical stability, v | 855 | 800 | 690 |
| HTHP filtrate, 300° F., ml | — | — | 3.0 |
| FANN 35 dial readings | | | |
| 600 rpm | 70 | 63 | 56 |
| 300 rpm | 48 | 42 | 37 |
| 200 rpm | 39 | 33 | 29 |
| 100 rpm | 29 | 24 | 20 |
| 6 rpm | 13 | 11 | 8 |
| 3 rpm | 12 | 10 | 7 |

[1]Emulsifier (blend of tall oil and polyaminated fatty acid).
[2]Organophilic leonardite filtration control agent
[3]Organophilic clay viscosifier.
[4]Emulsifier (polyaminated fatty acid).
[5]Organophilic clay viscosifier.

TABLE 2(b)

NEW Diesel Mud Formulations and Properties
(Example Formulation & Properties of a Diesel Drilling
Fluid of the Present Invention) 12 lb/gal, 250K ppm CaCl$_2$ WPS

| | Sample Formulation | | |
|---|---|---|---|
| | D | E | F |
| Diesel, bbl | 0.575 | 0.533 | 0.533 |
| LE ™ SUPERMUL[1], lb | 12 | 12 | 12 |
| Lime, lb | 2 | 2 | 2 |
| ADAPTA ™[2], lb | 2 | 2 | 2 |
| POLYBOOST ™[3], lb | 10 | 10 | 11 |
| Water, bbl | 0.204 | 0.244 | 0.244 |
| RHEMOD ™ L[4], lb | 2 | 2 | 2.5 |
| Barite, lb | 216 | 204 | 204 |
| Calcium Chloride, lb | 24.8 | 29.7 | 29.7 |
| OWR (oil:water ratio) | 75/25 | 70/30 | 70/30 |
| Properties | | | |
| Rolled @ 150° F., hr | 16 | 16 | 16 |
| Stirred, min | 10 | 10 | 10 |
| Temperature, ° F. | 120 | 120 | 120 |
| Plastic viscosity, cP | 25 | 30 | 31 |
| Yield point, lb/100 ft$^2$ | 15 | 22 | 22 |
| Tao 0, lb/100 ft$^2$ | 1.8 | 4.8 | 5.0 |
| 10 Sec gel, lb/100 ft$^2$ | 7 | 11 | 8 |
| 10 Min gel, lb/100 ft$^2$ | 18 | 23 | 27 |
| Electrical stability, v | 620 | 410 | 370 |
| HTHP filtrate, 300° F., ml | — | — | 2.0 |
| FANN 35 dial readings | | | |
| 600 rpm | 65 | 82 | 84 |
| 300 rpm | 40 | 52 | 53 |
| 200 rpm | 30 | 40 | 42 |
| 100 rpm | 20 | 27 | 28 |
| 6 rpm | 4 | 8 | 8 |
| 3 rpm | 3 | 6 | 7 |

[1]Polyaminated fatty acid emulsifier.
[2]Co-polymer filtration control agent.
[3]Non-organophilic clay/crystalline silica material
[4]Modified fatty acid (dimers & trimers) suspension agent/viscosifier.

TABLE 3(a)

FANN 75 Viscometer Data
for Sample INVERMUL ™ Mud
INVERMUL ™ Mud - Sample C from Table 2(a)

| Temperature, ° F. | 150 | 225 | 300 | 350 |
|---|---|---|---|---|
| Pressure, psi | 0 | 5000 | 7000 | 8000 |
| Plastic viscosity, cP | 18 | 17 | 19 | 15 |
| Yield point, lb/100 ft$^2$ | 8 | 20 | 15 | 2 |
| FANN 75 dial readings | | | | |
| 600 rpm | 44 | 54 | 53 | 32 |
| 300 rpm | 26 | 37 | 34 | 17 |
| 200 rpm | 21 | 32 | 28 | 12 |
| 100 rpm | 16 | 24 | 21 | 9 |
| 6 rpm | 5 | 10 | 7 | 3 |
| 3 rpm | 5 | 10 | 6 | 3 |

TABLE 3(b)

FANN 75 Viscometer Data
for Sample NEW Diesel Mud from Table 2(b)
NEW Diesel Mud - Sample F from Table 2(b)

| Temperature, ° F. | 150 | 225 | 300 | 350 |
|---|---|---|---|---|
| Pressure, psi | 0 | 5000 | 7000 | 8000 |
| Plastic viscosity, cP | 25 | 28 | 20 | 16 |
| Yield point, lb/100 ft$^2$ | 22 | 57 | 46 | 29 |
| FANN 75 dial readings | | | | |
| 600 rpm | 72 | 113 | 86 | 61 |
| 300 rpm | 47 | 85 | 66 | 45 |
| 200 rpm | 39 | 73 | 57 | 38 |
| 100 rpm | 27 | 60 | 47 | 30 |
| 6 rpm | 13 | 43 | 27 | 14 |
| 3 rpm | 15 | 41 | 25 | 12 |

The diesel invert emulsion drilling fluids of the present invention preferably do not have any organophilic clays or organophilic lignites added to them. The fluids of the invention do not need organophilic clays or organophilic lignites to provide their needed viscosity, suspension characteristics, or filtration control to carry drill cuttings to the well surface. Moreover, the lack of appreciable amounts of organophilic clays and organophilic lignites in the fluids is believed to enhance the tolerance of the fluids to the drill cuttings. That is, the lack of appreciable amounts of organophilic clays and organophilic lignites in the fluids of the invention is believed to enable the fluids to suspend and carry drill cuttings without significant change in the fluids' Theological properties.

Experimental

The present invention provides a drilling fluid with a substantially flat Theological profile. Tables 4, 5, and 6 provide example rheological data for three example drilling fluids of the invention comprising 16.0 pounds per gallon ("ppg" or "lb/gal"), 17.2 lb/gal and 16.0+lb/gal respectively. These fluids are comprised of substantially the same composition (except for weight) as the example New Diesel Mud of the invention specified in Table 2(b) above. The fluids were tested at their respective known bottom hole temperatures and calculated pressures as used in drilling their respective wells. A midpoint temperature and pressure was also included in the FANN 75 viscometer test sequences. The tables include data for electrical stability (ES), FANN 35 viscometer rheology, and FANN 75 viscometer rheology. As used in Tables 4, 5 and 6, "n" and "K" are Power Law model rheology parameters.

TABLE 4

FANN 35 & 75 Viscometer Rheological Properties
16.0 lb/gal NEW Diesel Fluid
Field sampled at 11,909' True Vertical Depth (TVD)

|  | FANN 35 | | FANN 75 | |
| --- | --- | --- | --- | --- |
| Temperature, ° F. | 150 | 150 | 200 | 265 |
| Pressure, psi | 0 | 0 | 4,500 | 9,900 |
| FANN 75 Dial Readings | | | | |
| 600 rpm | 103 | 99 | 102 | 97 |
| 300 rpm | 61 | 60 | 65 | 63 |
| 200 rpm | 46 | 46 | 52 | 51 |
| 100 rpm | 30 | 31 | 36 | 37 |
| 6 rpm | 10 | 11 | 16 | 14 |
| 3 rpm | 8 | 9 | 13 | 13 |
| Plastic viscosity, cP | 42 | 39 | 37 | 34 |
| Yield Point, lb/100 ft² | 19 | 21 | 28 | 29 |
| Gels 10"/10'/30', lb/100 ft² | 12/20/22 | — | — | — |
| N | 0.830 | 0.830 | 0.752 | 0.695 |
| K, lb/100 ft² | 0.319 | 0.365 | 0.511 | 0.726 |
| Tau 0, lb/100 ft² | 7.7 | 8.6 | 12.2 | 10.8 |

Mud weight was measured at 16.0 lb/gal at room temperature and the ES was 639 volts at 150° F.

TABLE 5

FANN 35 & 75 Viscometer Rheological Properties
17.2 lb/gal New Diesel Fluid
Field sampled at 11,875' TVD

|  | FANN 35 | | FANN 75 | |
| --- | --- | --- | --- | --- |
| Temperature, ° F. | 150 | 150 | 225 | 300 |
| Pressure, psi | 0 | 0 | 5,300 | 10,600 |
| FANN 75 Dial Readings | | | | |
| 600 rpm | 84 | 85 | 80 | 76 |
| 300 rpm | 48 | 47 | 46 | 44 |
| 200 rpm | 36 | 36 | 36 | 35 |
| 100 rpm | 23 | 24 | 24 | 24 |
| 6 rpm | 7 | 8 | 8 | 9 |
| 3 rpm | 6 | 7 | 7 | 8 |
| Plastic viscosity, cP | 36 | 38 | 34 | 32 |
| Yield Point, lb/100 ft² | 12 | 9 | 12 | 12 |
| Gels 10"/10'/30', lb/100 ft² | 9/16/17 | — | — | — |
| N | 0.868 | 0.917 | 0.854 | 0.863 |
| K, lb/100 ft² | 0.201 | 0.143 | 0.207 | 0.181 |
| Tau 0, lb/100 ft² | 5.7 | 7.2 | 6.8 | 8.0 |

Mud weight was measured at 17.2 lb/gal at room temperature and the ES was 1025 volts at 150° F.

TABLE 6

FANN 35 & 75 Viscometer Rheological Properties
16.0+ lb/gal New Diesel Fluid
Field sampled on at 12,900' TVD

|  | FANN 35 | | FANN 75 | |
| --- | --- | --- | --- | --- |
| Temperature, ° F. | 150 | 150 | 225 | 300 |
| Pressure, psi | 0 | 0 | 5,400 | 10,800 |
| FANN 75 Dial Readings | | | | |
| 600 rpm | 91 | 93 | 88 | 86 |
| 300 rpm | 54 | 55 | 55 | 54 |
| 200 rpm | 41 | 42 | 43 | 44 |
| 100 rpm | 27 | 28 | 30 | 32 |
| 6 rpm | 8 | 9 | 11 | 11 |
| 3 rpm | 7 | 8 | 10 | 10 |
| Plastic viscosity, cP | 37 | 38 | 33 | 32 |
| Yield Point, lb/100 ft² | 17 | 17 | 22 | 22 |
| Gels 10"/10'/30', lb/100 ft² | 11/18/18 | — | — | — |
| N | 0.809 | 0.824 | 0.763 | 0.716 |
| K, lb/100 ft² | 0.328 | 0.299 | 0.420 | 0.563 |
| Tau 0, lb/100 ft² | 6.1 | 7.3 | 8.8 | 8.5 |

Mud weight was measured at 16.0+ lb/gal at room temperature and the ES was 762 volts at 150° F.

The preferred temperature range for use of a drilling fluid of the present invention extends from about 38° F. to at least about 450° F., although the fluid is believed to be useful in drilling wells in subterranean formations having temperatures as hot as 500° F. or more. The preferred mud weight for a drilling fluid of the invention extends from about 7 ppg. to about 18.5 ppg.

Field Tests

Figure 3:
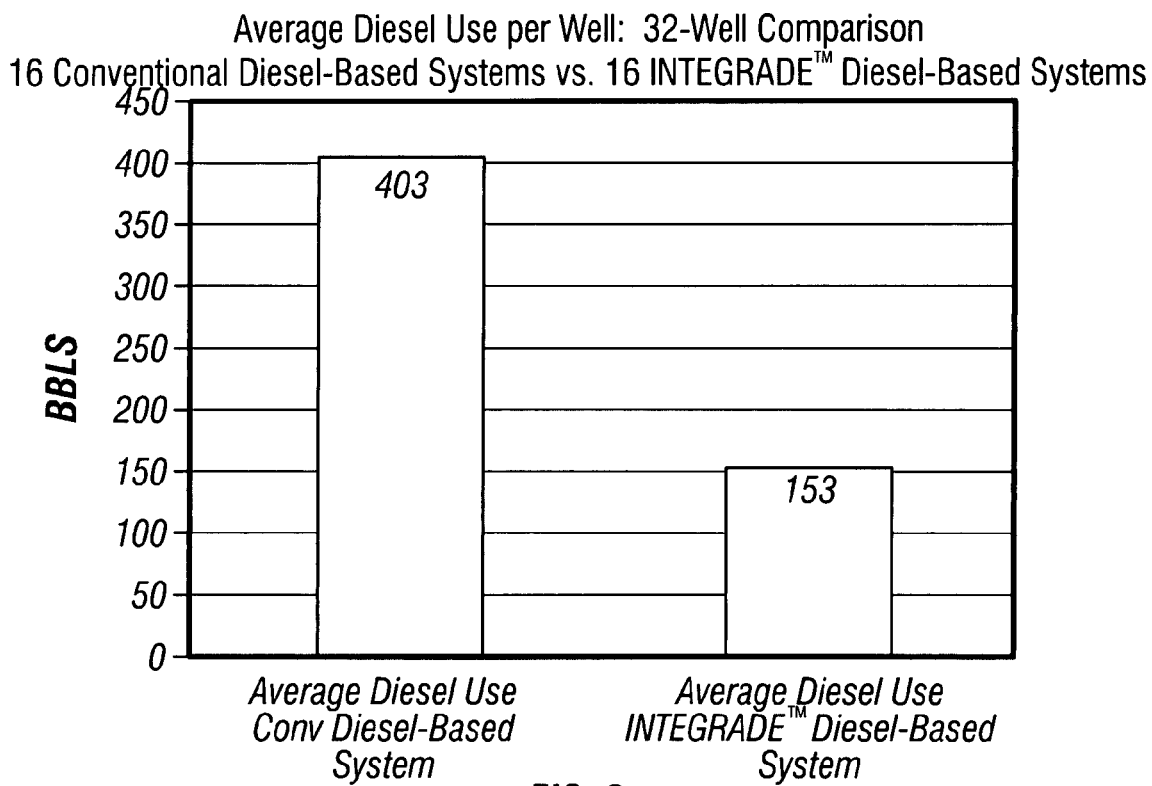
FIG. 3 is a bar graph showing the average diesel use (in drilling fluid formulation) per well in a 32-well comparison where 16 wells were drilled using commercial diesel based drilling fluids formulated with an organophilic clay viscosifier and 16 wells were drilled using an example diesel based drilling fluid of the present invention, indicating that less diesel is employed in the drilling fluids of the invention than in other diesel based drilling fluids.

The present invention has been tested in the field and the field data demonstrates the advantageous performance of the fluid compositions of the invention and the methods of using them. As illustrated in FIG. 3, for example, the present invention provides a diesel invert emulsion drilling fluid that may be used in drilling boreholes or wellbores in subterranean formations, and in other drilling operations in such formations (such as in casing and cementing wells), requiring substantially less consumption of diesel, when compared to drilling operations using other diesel fluids.

For another example, in one field, an operator drilled a deep slim-hole (4¼") re-entry well (62° maximum angle) to 12,416 ft using an example 15.3 ppg fluid of the present invention with zero mud losses in an area where all the offset wells had experienced significant mud losses (average of 1,178 bbl on three offset wells) with diesel fluids having organophilic clay viscosifiers. Reducing and controlling the equivalent circulating density (ECD) was considered a critical factor in minimizing or eliminating losses while drilling this deviated slim-hole. The formation integrity test at the casing shoe had been 17.1 ppg, but the operator encountered depleted sands at 3,760-ft with formation pressures of 3.0 to 5.0 ppg equivalent mud weight (EMW).

The significant reduction in fluid loss seen with the present invention is believed to be due at least in substantial part to the "fragile gel" behavior of the fluid of the present invention and to the chemical structure of the fluid that contributes to, causes, or results in that fragile gel behavior. According to the present invention, fluids having fragile gel behavior provide significant reduction in fluid losses during drilling (and casing and cementing) operations when compared to fluid losses incurred with other drilling fluids that do not have fragile gel behavior. Thus, according to the methods of the invention, drilling fluid loss may be reduced by employing a drilling fluid in drilling operations that is formulated to comprise fragile gels or to exhibit fragile gel behavior. As used herein, the term "drilling operations" shall mean drilling, running casing and/or cementing unless indicated otherwise. Drilling fluids of the present invention may be used in drilling, running casing, cementing, and/or producing hydrocarbons from subterranean formations.

Figure 4:
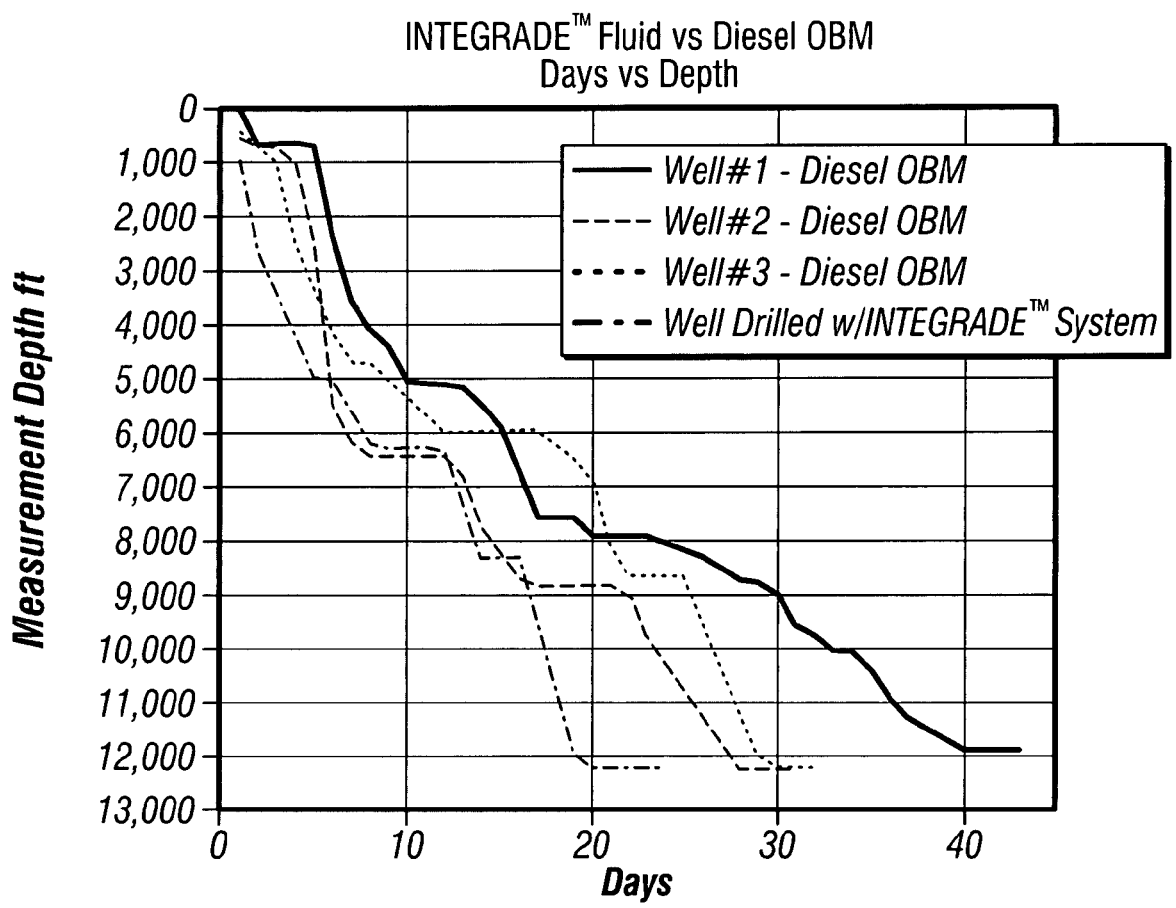
FIG. 4 is a graph comparing the rates of penetration in drilling a well using a diesel based drilling fluid of the present invention with the rates of penetration in drilling three comparable wells using commercial diesel based drilling fluids formulated with an organophilic clay viscosifier.
Figure 5:
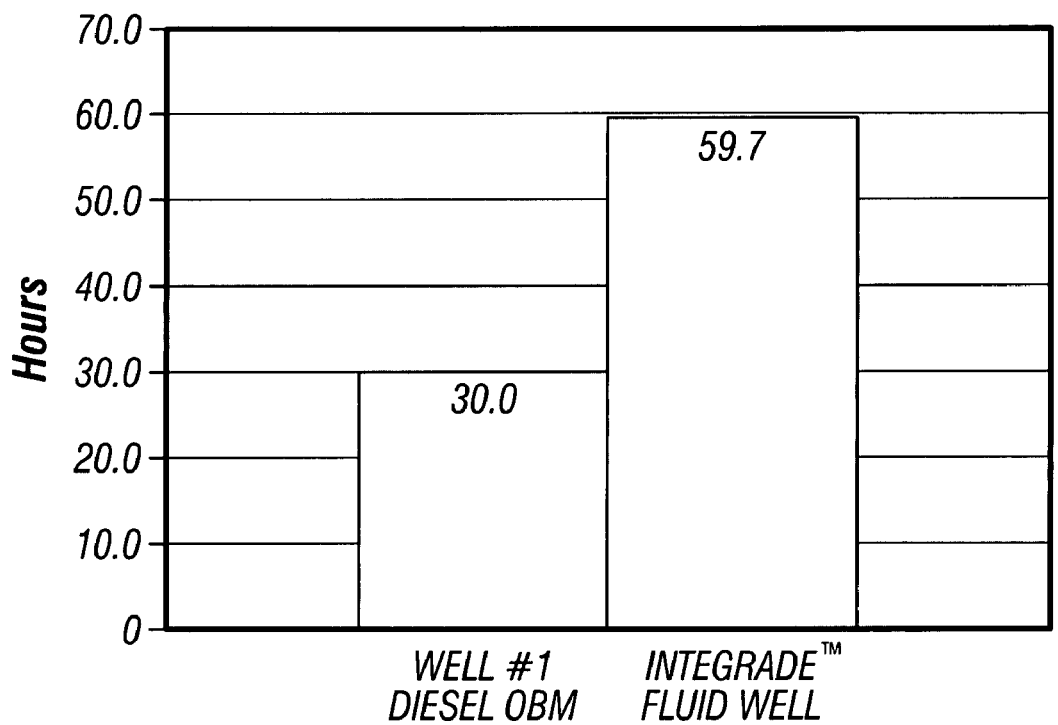
FIG. 5 is a bar graph showing the average rate of penetration in ft/hr during drilling with a diesel based drilling fluid of the present invention compared to drilling with a commercial diesel based-drilling fluid formulated with an organophilic clay viscosifier.
Figure 6:
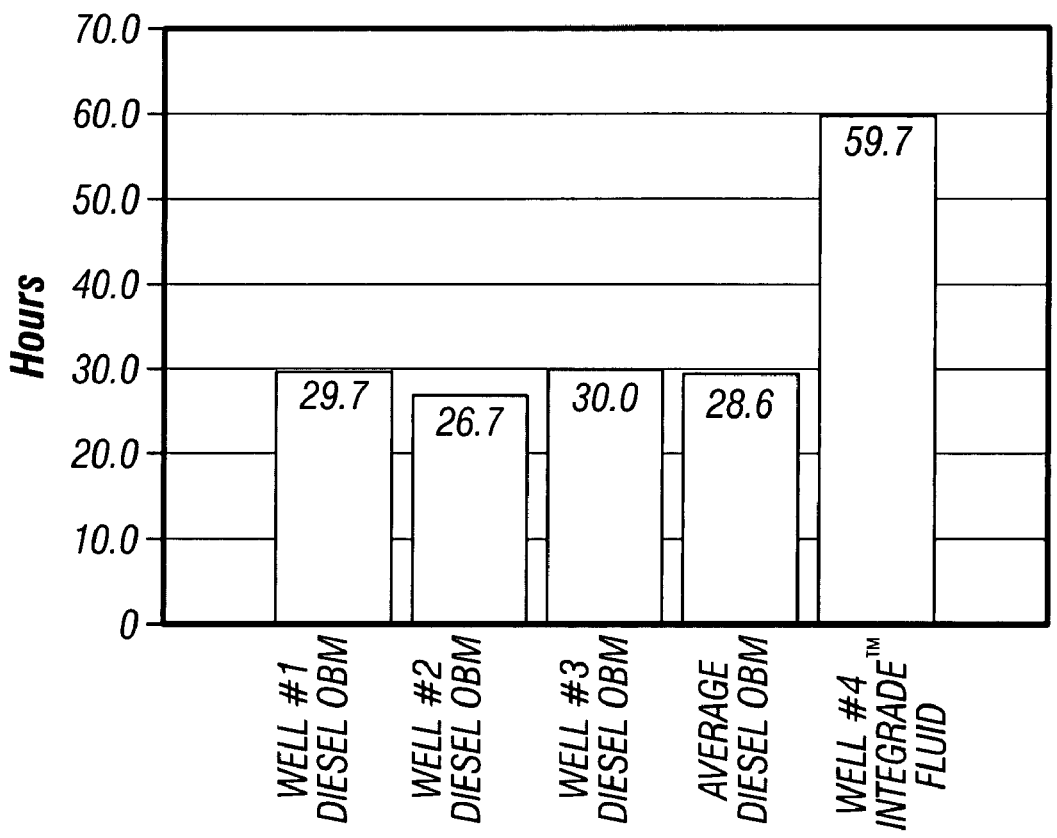
FIG. 6 is a bar graph showing the average rate of penetration in ft/hr of the wells plotted in the graph in FIG. 4, and particularly comparing the rates of drilling a well with an example diesel-based drilling fluid of the invention with the rates of drilling three comparable wells using a commercial diesel-based drilling fluid formulated with an organophilic clay viscosifier.

Rate of penetration, another important indicator of drilling performance, is enhanced by the low colloidal content of the drilling fluids of the present invention, as demonstrated by a field test with four wells selected for comparison based on their similarity. As shown in FIG. 4, three of the wells were drilled with a diesel-based fluid having an organophilic clay viscosifier (Wells 1, 2, 3). The fourth well was drilled with an example fluid of the present invention, INTEGRADE™ fluid, available from Halliburton Energy Services, Inc. in Houston, Tex. (Well 4). Four strings of casing were set on each well. The wells were displaced to oil-based fluid between 6,300 and 7,000 ft and drilled to approximately the same total depth (TD) of ±12,000 ft. The bottomhole temperature on the four wells ranged from 325° F. to 340° F. The 8¾" intermediate sections were drilled with mud weights between 10.5 to 11.5 ppg. The 6¼" production intervals were drilled with mud weights between 15.2 to 15.7 ppg. The well drilled with the example fluid of the present invention reached TD at 12,225 feet in eight less days than the fastest well drilled with a diesel based fluid having an organophilic clay viscosifier (see FIG. 4), while requiring fewer products and diesel additions on a daily basis. Based on the rig spread rate of $38,000, the reduction in rig time resulted in a savings of $304,000. When calculated based on an average of the days required to drill to TD on all three conventional fluid jobs, the well drilled with INTEGRADE™ fluid reached TD in 12 fewer days. Using the same $38,000 daily spread rate, the rig savings calculated to $456,000. The 8¾" and 6¼" intervals drilled with the fluid of the present invention showed marked improvement on rate of penetration (ROP), achieving an increase of 99.0% and 108.0% respectively (FIGS. 5 and 6). Without wishing to be limited by theory, the improved rate of penetration achieved with the fluid of the invention is believed to be due to the unique "clay-free" formulation of the fluid. The emulsifiers and polymers used with the system of the invention help eliminate the need to add colloidal size solids, such as organophilic clays, that are common in diesel-based muds. A high colloidal solids content can impair rate of penetration and increase the demand for diesel and additives in a diesel-based mud.

Figure 7A:
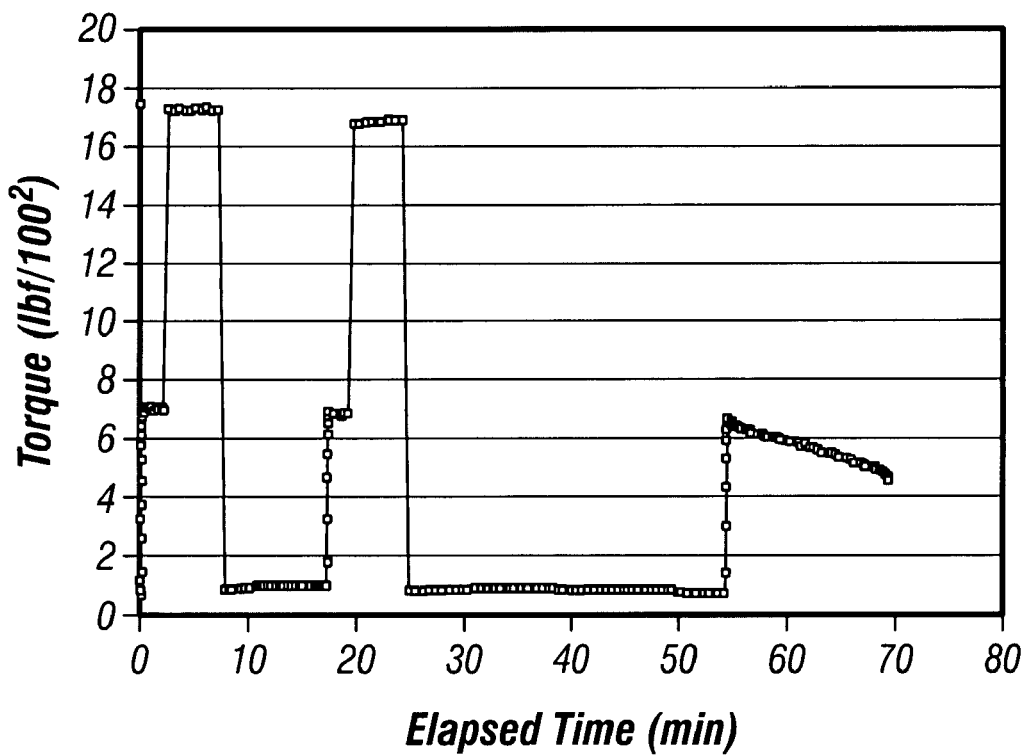
FIG. 7(a) and FIG. 7(b) are graphs comparing Brookfield stress test data for a commercial diesel-based drilling fluid formulated with a clay viscosifier (FIG. 7(a)) and a diesel-based fluid of the present invention (FIG. 7(b)).
Figure 7B:
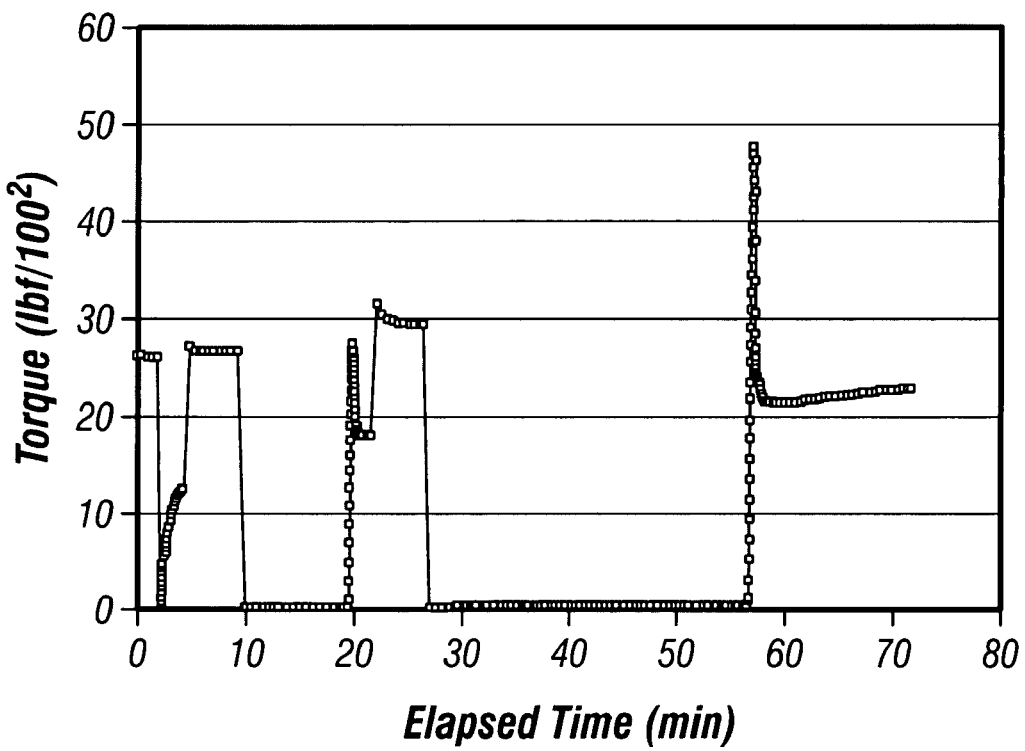

FIGS. 7(a) and 7(b) represent in graphical form Brookfield test data indicating gel formation and gel strength in the samples listed in Tables 2(a) and 2(b) respectively. FIG. 2 discussed above also represents in graphical form the results of a Brookfield test with an example fluid of the present invention and a diesel fluid that has an organophilic clay viscosifier. When the fluids are at rest or static (as when drilling has stopped in the wellbore), the curves are flat or relatively flat (see area at about 25-55 minutes elapsed time for example). When shear stress is resumed (as in drilling), the curves move up straight vertically or generally vertically (see area at about 55 elapsed minutes for example), with the height of the peak value being proportional to the amount of gel formed—the higher the peak the more gel built up. The curves then fall down and level out or begin to level out, with the faster rate at which the horizontal line forms (and the closer the horizontal line approximates true horizontal) indicating the lesser resistance of the fluid to the stress and the lower the pressure required to move the fluid.

FIGS. 2 and 7(b) indicate superior response and performance by the drilling fluids of the present invention. Not only do the fluids of the present invention appear to build up more "gel" when at rest, which enables the fluids of the invention to better maintain weight materials and drill cuttings in suspension when at rest—a time other diesel based fluids are more likely to have difficulty suspending such solid materials—but the fluids of the present invention nevertheless surprisingly provide less resistance to the sheer, which will result in lower ECDs.

A Brookfield test as used herein, also called a Brookfield viscometer gel strength test procedure, uses a BROOKFIELD DV-II+ Programmable (or non-programmable) viscometer to measure the gel strengths of a drilling fluid using a vane spindle. The test allows for a more detailed description of the gel structure and uses lower revolution speeds than a FANN 35A viscometer. For the test, the Brookfield viscometer should have an LV Spring with spindle guard off, and if the viscometer is programmable, the GELS-120.D2S test sequence should be installed. If the viscometer is not programmable, the same test sequence should be followed but the data will have to be recorded and graphed manually. Also needed for the test are a V-73 vane spindle, modified in length (vane dimensions include a length of 0.468 inches and an outside diameter of 0.499 inches), a thermometer, a FANN Thermo cup, and preferably a computer with I/O port and DataWizard software. The testing procedure is set forth in Table 7. The GELS-120.D2S test sequence is set forth in Table 8.

TABLE 7

Brookfield Gel Strength Test Procedure

1. After obtaining a fluid sample, stir for 15 minutes on a Multimixer. Set up a data storage file on the computer connected to the instrument. To do this, double-click the "Brookfield Data Capture" icon. Enter a file name and click the "Open" button.

2. Pour the fluid into a Thermo-cup which has been pre-heated to 120-125° F.; fill to a level around 1"-1½" below the lip.

3. Stir the fluid gently with a small spatula to help it to reach temperature.

4. Lower the viscometer so that the spindle enters the sample to the scribe mark.

5. Start the automatic test (see the attached Table for the detailed test sequence).

6. Center the spindle.

7. Make sure the instrument and Thermo-cup are on a stable surface free from vibration.

8. Verify the cup temperature is maintained throughout testing at 120-125° F.

9. When complete, save the data file to a disk and process using MS Excel. The theoretical conversion factor for obtaining standard units of $(lbf/100^2)$ from the output torque % readings is 0.370.

10. Carefully raise the viscometer, remove and clean the spindle.

TABLE 8

Detailed Test Sequence
GELS-120.D2S

| Step No. | Brookfield Command | Set Pt. | Comment |
|---|---|---|---|
| 1 | SPI | 00:30 | Take data every 30 sec |
| 2 | SSN | 100 | Stirring at 100 rpm while heating |
| 3 | WTP | 48.0 | Temp of 118-120° F. |
| 4 | WTI | 15:00 | When at temp. stir 15 more min |
| 5 | SSN | 0.0 | Stop stirring |
| 6 | SPI | 00:01 | Take data every sec |
| 7 | WTI | 00:10 | Wait for 10 sec gel |
| 8 | SSN | 0.5 | Stir at 0.5 rpm |
| 9 | WTI | 02:00 | Continue for 2 min |
| 10 | SPI | 00:30 | Take data every 30 sec |
| 11 | SSN | | Stir at 100 rpm to break the gel |
| 12 | WTI | 05:00 | Continue for 5 min |
| 13 | SSN | | Stop stirring |
| 14 | WTI | 10:00 | Wait for 10 min gel |
| 15 | SPI | 00:01 | Take data every sec |
| 16 | SSN | | Stir at 0.5 rpm |
| 17 | WTI | 02:00 | Continue for 2 min |
| 18 | SPI | 00:30 | Take data every 30 sec |
| 19 | SSN | 100 | Stir at 100 rpm to break the gel |
| 20 | WTI | 05:00 | Continue for 5 min |
| 21 | SSN | 0.0 | Stop stirring |
| 22 | WTI | 30:00 | Wait for 30 min gel |
| 23 | SPI | 00:01 | Take data every sec |
| 24 | SSN | | Stir at 0.5 rpm |
| 25 | WTI | 15.00 | Continue for 15 min |

As indicated above, the advantages of the methods of the invention may be obtained by employing a drilling fluid of the invention in drilling operations. The drilling operations—whether drilling a vertical or directional or horizontal borehole, conducting a sweep, or running casing and cementing—may be conducted as known to those skilled in the art with other drilling fluids. That is, a drilling fluid of the invention is prepared or obtained and circulated through a wellbore as the wellbore is being drilled (or swept or cemented and cased) to facilitate the drilling operation. The drilling fluid removes drill cuttings from the wellbore, cools and lubricates the drill bit, aids in support of the drill pipe and drill bit, and provides a hydrostatic head to maintain the integrity of the wellbore walls and prevent well blowouts. The specific formulation of the drilling fluid in accordance with the present invention is optimized for the particular drilling operation and for the particular subterranean formation characteristics and conditions (such as temperatures). For example, the fluid is weighted as appropriate for the formation pressures and thinned as appropriate for the formation temperatures. As noted previously, the fluids of the invention afford real-time monitoring and rapid adjustment of the fluid to accommodate changes in such subterranean formation conditions. Further, the fluids of the invention may be recycled during a drilling operation such that fluids circulated in a wellbore may be recirculated in the wellbore after returning to the surface for removal of drill cuttings for example. The drilling fluid of the invention may even be selected for use in a drilling operation to reduce loss of drilling mud during the drilling operation and/or to comply with environmental regulations governing drilling operations in a particular subterranean formation.

The foregoing description of the invention is intended to be a description of preferred embodiments. Various changes in the details of the described fluids and methods of use can be made without departing from the intended scope of this invention as defined by the appended claims.

What is claimed is:

1. A method for drilling in a subterranean formation comprising the steps of providing an invert emulsion drilling fluid; and drilling in the subterranean formation with the drilling fluid, the drilling fluid comprising:
   a continuous phase comprising a diesel oil,
   an internal phase comprising water,
   a weighting agent,
   an emulsifier,
   a modified fatty acid rheology modifier comprising dimeric and trimeric fatty acids,
   a copolymer filtration control agent, and
   0 to about 3 pounds per barrel of organophilic clay and lignite;
   wherein the drilling fluid has a substantially flat rheological profile as measured using a FANN viscometer at 3 rpm or 6 rpm at atmospheric pressure.

2. The method of claim 1 wherein the drilling fluid can tolerate an influx of water during drilling and a resulting water to oil ratio as low as 52:48.

3. The method of claim 2 wherein such tolerance is evidenced by the drilling fluid not flipping or yielding water-wet solids.

4. The method of claim 2 wherein such tolerance is evidenced by the drilling fluid not having water in the HPHT filtrate.

5. The method of claim 1 wherein the drilling fluid suspends the weighting agent when stresses or forces associated with drilling are reduced or removed; produces substantially no pressure spike upon resuming stopped drilling, as detected by pressure-while-drilling equipment or instruments; or a combination thereof.

6. The method of claim 1 wherein the emulsifier comprises a polyaminated fatty acid or a blend of ethylene glycol monobutyl ether, diethylene glycol monobutyl ether and diesel oil.

7. The method of claim 1 wherein the continuous phase further comprises one or more natural or synthetic oils selected from the group consisting of: polyalphaolefins; isomerized olefins; internal olefins; paraffins; mineral oils; and glyceride triesters.

8. The method of claim 1 wherein the copolymer filtration control agent comprises methylstyrene/acrylate.

9. The method of claim 1 wherein the copolymer filtration control agent comprises a tall oil derivative.

10. The method of claim 1 wherein the drilling fluid further comprises a thinner comprising lecithin.

11. The method of claim 1 wherein the drilling fluid comprises about 25% to about 30% calcium chloride.

12. The method of claim 1 wherein the drilling fluid is used in drilling a well with loss of the drilling fluid being less than about 1 barrel per barrel of hole drilled.

13. The method of claim 1 wherein the drilling fluid has a 30-minute gel strength as measured by a Brookfield test of at least about 40 lb/100 ft$^2$ at 120° F., which returns to a gel strength of about 10 lb/100 ft$^2$ at 120° F. when sheared.

14. A method for drilling in a subterranean formation comprising the steps of providing an invert emulsion drilling fluid; and drilling in the subterranean formation with the drilling fluid while substantially maintaining an average ECD of less than 0.5 over a drilling interval of at least about 200 feet; the drilling fluid comprising:
   a continuous phase comprising a diesel oil,
   an internal phase comprising water,
   a weighting agent,
   an emulsifier, a modified fatty acid rheology modifier comprising dimeric and trimeric fatty acids, and a copolymer filtration control agent, and 0 to about 3 pounds per barrel of organophilic clay and lignite;

wherein the drilling fluid has a substantially flat rheological profile as measured using a FANN viscometer at 3 rpm or 6 rpm at atmospheric pressure.

15. The method of claim 14 wherein the drilling fluid suspends the weighting agent when stresses or forces associated with drilling are reduced or removed; produces substantially no pressure spike upon resuming stopped drilling, as detected by pressure-while-drilling equipment or instruments; or a combination thereof.

16. The method of claim 14 wherein the emulsifier comprises polyaminated fatty acid or a blend of ethylene glycol monobutyl ether, diethylene glycol monobutyl ether and diesel oil.

17. The method of claim 14 wherein the copolymer filtration control agent comprises methylstyrene/acrylate or a tall oil derivative.

18. The method of claim 14 wherein the drilling fluid is used in drilling a well with loss of the drilling fluid being less than about 1 barrel per barrel of hole drilled.

19. The method of claim 1 wherein the drilling fluid comprises about 25% to about 30% calcium chloride.

20. An invert emulsion drilling fluid for use in a subterranean formation comprising: a continuous phase comprising a diesel oil;

an internal phase comprising high salinity water;

a weighting agent;

an emulsifier comprising a polyaminated fatty acid or a blend of ethylene glycol monobutyl ether, diethylene glycol monobutyl ether and diesel oil;

a modified fatty acid rheology modifier comprising dimeric and trimeric fatty acids;

a methylstyrene/acrylate copolymer filtration control agent; and 0 to about 3 pounds per barrel of organophilic clay and lignite.

21. A method for drilling in a subterranean formation comprising the steps of:

providing an invert emulsion drilling fluid having an internal phase comprising water and a continuous phase comprising diesel oil; and drilling in the subterranean formation with the drilling fluid, wherein the drilling fluid has a substantially flat rheological profile as measured using a FANN viscometer at 3 rpm or 6 rpm at atmospheric pressure.

22. The method of claim 21 wherein the invert emulsion drilling fluid further comprises at least one additive selected from the group consisting of a weighting agent, an emulsifier, a rheology modifier, a filtration control agent, a thinner, and any combination thereof.

23. The method of claim 21 wherein the invert emulsion drilling fluid further comprises at least one additive selected from the group consisting of a weighting agent, an emulsifier, a modified fatty acid rheology modifier comprising dimeric and trimeric fatty acids, a copolymer filtration control agent, 0 to about 3 pounds per barrel of organophilic clay and lignite, a thinner, and any combination thereof.

24. The method of claim 21 wherein the drilling fluid produces substantially no pressure spike upon resuming stopped drilling, as detected by pressure-while-drilling equipment or instruments.

* * * * *